United States Patent
Shon et al.

(10) Patent No.: US 8,175,627 B2
(45) Date of Patent: May 8, 2012

(54) METHOD AND APPARATUS FOR TRANSMITTING/RECEIVING DATA IN WIRELESS SENSOR NETWORK

(75) Inventors: Tae-Shik Shon, Suwon-si (KR); Wook Choi, Hwaseong-si (KR); Hyo-Hyun Choi, Seoul (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 977 days.

(21) Appl. No.: 12/131,998

(22) Filed: Jun. 3, 2008

(65) Prior Publication Data

US 2009/0029650 A1    Jan. 29, 2009

(30) Foreign Application Priority Data

Jul. 25, 2007    (KR) .................. 10-2007-0074749

(51) Int. Cl.
*H04B 7/00* (2006.01)
*H04B 1/00* (2006.01)
*H04B 15/00* (2006.01)

(52) U.S. Cl. ............ 455/513; 455/68; 455/69; 455/63.1

(58) Field of Classification Search ............... 455/426.1, 455/444, 517, 519, 513, 58, 69, 63.1
See application file for complete search history.

(56) References Cited

U.S. PATENT DOCUMENTS

| | | | | |
|---|---|---|---|---|
| 6,415,313 | B1 * | 7/2002 | Yamada et al. | 709/200 |
| 7,663,481 | B2 * | 2/2010 | Kim et al. | 340/539.22 |
| 7,761,561 | B2 * | 7/2010 | Muro et al. | 709/224 |
| 7,881,206 | B2 * | 2/2011 | St. Pierre et al. | 370/238 |
| 2007/0037602 | A1 | 2/2007 | Shimizu et al. | |
| 2008/0071892 | A1 * | 3/2008 | Muro et al. | 709/221 |

OTHER PUBLICATIONS

Deshpande, Sachin; "Adaptive Low-Bitrate Streaming Over IEEE 802.15.4 Low Rate Wireless Personal Area Netwoiks (LR-WPAN) Based on Link Quality Indication;" Jul. 3, 2006; <http://portal.acm.orq/author_page.cfm?id=81100017184&coll=GUIDE&dl=GUIDE&trk=0&,CFID=67079043&CFTOKEN=53728154> (rtrvd from internet on Dec. 8, 2009); XP002560072.

(Continued)

*Primary Examiner* — Tilahun B Gesesse
(74) *Attorney, Agent, or Firm* — Cha & Reiter, LLC

(57) ABSTRACT

A method and apparatus for transmitting/receiving data in a Wireless Sensor Network (WSN). The method typically includes the steps of: ascertaining characteristics of data whose transfer is requested; ascertaining a Link Quality Indication Value (LQIV); determining a level of a link state in consideration of the characteristics of the data and the LQIV; and controlling the link transfer of the data in consideration of the level of the link state. The apparatus includes a module for transmitting/receiving data in the network layer thereof having a link level determination unit for predefining a level of a link state, depending on characteristics of data and a Link Quality Indication Value (LQIV) to store a predefined level of the link state, and to determine a level of the link state. A link control unit controls the link transfer of the data in consideration of the determined level of the link state.

23 Claims, 10 Drawing Sheets

OTHER PUBLICATIONS

Willig, A., et al.; "Data Transport Reliability in Wireless Sensor Networks—A Survey of Issues & Solutions;" Praxis der Informationsverarbeitung und Kommunikation; vol. 28, Issue 2; Apr. 1, 2005; <http://www.reference-global.com/doi/abs/10.1515/PIKO.2005.86> (Rtrvd from internet on Dec. 10, 2009); XP002559971.

LAN/MAN Standards Committee; "IEEE 802.15.4-2006: Wireless Medium Access Control (MAC) and Physical Layer (PHY) Specification for Low-Rate Wireless Personal Area Networks (WPANs);" Sep. 8, 2006; < http://ieeexplore.ieee.orq/xpls/abs_all.jsp?tp=&isnumber=35824&arnumber=1700009&pnumber=11161&tag=1 > (rtrvd from internet on Dec. 9, 2009); XP002559972.

Gao, Chao, et al.; "Link-State Clustering Based on IEEE 802.15.4 MAC for Wireless Ad-hoc/Sensor Networks;" Conference on Wireless Communications & Networking, Las Vegas, NV; Apr. 3, 2006; XP031331349.

* cited by examiner

- ● : PAN Coordinator
- ◉ : Cluster Head (CLH)
- ○ : Device
- — : Parent-Child Relationships, not Communication Flow

METHOD AND APPARATUS FOR TRANSMITTING/RECEIVING DATA IN WIRELESS SENSOR NETWORK

CLAIM OF PRIORITY

This application claims the benefit of priority under 35 U.S.C. §119(a) from an application entitled "Method and Apparatus for Transmitting/Receiving Data in Wireless Sensor Network," filed in the Korean Intellectual Property Office on Jul. 25, 2007 and assigned Serial No. 2007-74749, the contents of which are incorporated herein by reference in its entirety.

BACKGROUND OF THE INVENTION

1. Field of the Invention

The present invention relates to a Wireless Sensor Network (WSN). More particularly, the present invention relates to the technology of transmitting/receiving data in a WSN and problems associated with unstable wireless links. Still more particularly, the present invention relates to a Wireless Sensor Network (WSN), and specifically to a method for checking wireless channel connection states and a type of data to be transmitted among devices constructing a WSN, and then controlling data transfer in consideration of the result of the check.

2. Description of the Related Art

A WSN differs from existing networks that have been realized for communication in that the WSN has been embodied for the purpose of collecting remote information. The WSN is typically equipped with a sensor node for processing information collected via a sensor and then transferring the processed information, and a sink node for sending transferred information to the outside. As a network is constructed of a large number of sensor nodes constructs a network, the structure of each sensor node should be simply designed. Also, since a certain sensor node may be arranged in an area to which it is difficult for a person to get access, the sensor nodes should be designed to consume little electric power so that the sensor node may operate for up to several months or several years with the same battery. In addition, the sensor nodes must be designed to have mobility so that each position in which the sensor node has been installed is enabled to be freely moved. Furthermore, even though some sensor nodes existing within the network are subject to being damaged, the WSN must be embodied so as not to be affected by the maintenance of the network.

Meanwhile, IEEE 802.15 Working Group defines the standards for a short-distance wireless network. More particularly, since the IEEE 802.15.4 standard defined by IEEE 802.15 Working Group enables low power short-distance wireless network to be realized, the IEEE 802.15.4 standard is quickly becoming a core technology which is suitable for being applied to a sensor network.

The IEEE 802.15.4 standard defines communication protocol related to the physical layer and the Medium Access Control Layer (hereinafter, referred to as the "MAC Layer") within a short-distance wireless network. Furthermore, the IEEE 802.15.4 standard discloses data frame transfer between a transmission apparatus and a receiving apparatus. In data frame transfer between a transmission apparatus and a receiving apparatus, the IEEE 802.15.4 provides a transfer process in consideration of three cases, FIGS. 1A to 1C illustrate a transfer process relevant to each case. Hereinafter, with reference to FIGS. 1A to 1C, a description will be made in detail of a transfer process relevant to each case.

(1) In the case of successful transfer of a data frame and an Acknowledgement (ACK) frame:

With reference to FIG. 1A, a transmission apparatus MAC layer 12 is requested to transmit a data frame from a transmission apparatus network layer 11 (step S100), and requests a transmission apparatus physical layer 13 to transmit a data frame (step S110). Then, the transmission apparatus physical layer 13 transmits a data frame to a receiving apparatus 2023 (step S120), and informs the transmission apparatus MAC layer 12 that the data frame has been transmitted (step S130). Accordingly, the transmission apparatus MAC layer 12 enables a timer to operate, and waits for receiving an ACK frame for a prescribed time interval, e.g., a period of time during which receiving the ACK frame from a receiving apparatus 20 is expected (step S140).

Meanwhile, if a receiving apparatus physical layer 23 receives the data frame, the receiving apparatus physical layer 23 informs a receiving apparatus MAC layer 22 that the data frame has been received (step S200). Then, the receiving apparatus MAC layer 22 delivers the received data frame to a receiving apparatus network layer 21 (step S210), and requests the receiving apparatus physical layer 23 to transmit the ACK frame to the transmission apparatus MAC layer 12 (step S220). In addition, the receiving apparatus physical layer 23 transmits the ACK frame to a transmission apparatus physical layer 10 (step S230), and informs the receiving apparatus MAC layer 22 that the ACK frame has been received (step S240).

Still referring to FIG. 1A, the transmission apparatus physical layer 13 delivers the ACK frame received from the receiving apparatus physical layer 23 to the transmission apparatus MAC layer 12 (step S300). The transmission apparatus MAC layer 12 enables a timer to be terminated, and informs the transmission apparatus network layer 11 that the transfer of the data frame has been completed (step S310).

(2) In the case of unsuccessful transfer of a data frame:

With reference to FIG. 1B, in the case of unsuccessful transfer of a data frame, by performing steps S100 to S140 as in the above-described case (i.e., in the case of successful transfer of a data frame), a data transfer is requested, and waiting for the reception of an ACK frame is implemented.

However, a wireless link state is often unstable between the transmission apparatus and the receiving apparatus, and therefore, a data frame transmitted from the transmission apparatus physical layer 13 cannot be delivered up to the receiving apparatus physical layer 23. Accordingly, the transmission apparatus physical layer 13 cannot receive the ACK frame from the receiving apparatus 20. After all, the transmission apparatus MAC layer 12 fails to receive the ACK frame until a timer is terminated, and repeatedly performs steps S110 to S140.

The transmission apparatus MAC layer 12 repeats this process up to three times, and if the transmission apparatus MAC layer 12 cannot receive a special ACK frame, it does not attempt to transmit the data frame again for a fourth time, but informs the transmission apparatus network layer 11 that the transfer of the data frame has failed (step S350).

(3) In a case where the transfer of a data frame has been successful but the transfer of an ACK frame fails:

With reference to FIG. 1C, in a case where the transfer of an ACK frame has failed, as in the above-described case (i.e., in the case of successful transfer of a data frame), the transmission apparatus 10 performs steps S100 to S140 to request data transfer, and waits for receiving an ACK frame. In addition, the receiving apparatus 20 delivers a data frame received through steps S200 to S240, to the receiving apparatus network layer 21, and transmits the ACK frame to the transmission apparatus 10.

However, since a wireless link state between the transmission apparatus and the receiving apparatus is unstable, the ACK frame transmitted from the receiving apparatus physical layer 23 cannot be delivered up to the transmission apparatus 10.

Finally, the transmission apparatus MAC layer 12 fails to receive the ACK frame until the timer is terminated, and repeatedly performs steps S110 to S140. The transmission apparatus MAC layer 12 repeats this process up to three times, and if the transmission apparatus MAC layer 12 cannot receive a special ACK frame, it does not attempt to transmit the data frame for a fourth time, but finally informs the transmission apparatus network layer 11 that the transfer of the data frame has failed (step S350).

Furthermore, Zigbee Union has tried the standardization of protocols of upper layers (the network layer and an application layer) which have not been suggested in the Zigbee protocol based on the IEEE 802.15.4 standard, i.e. the IEEE 802.15.4 standard. However, even in the Zigbee protocol, any plan for overcoming the above problem (i.e., a problem that the transfer of data is not implemented due to coupling errors among nodes) raised in the IEEE 802.15.4 standard has not been considered, either, and a solution to the above problem has not been suggested.

In order to embody a WSN, the reliability of each data frame transmitted among nodes must be secured. However, when the WSN is realized based on a protocol suggested in the IEEE 802.15.4 standard, or the Zigbee protocol, a wireless link state between specific nodes is unstable, and then, an error in data transfer can be caused repeatedly. Namely, a problem that the reliability of a data frame transmitted through unstable wireless link is raised. However, despite the occurrence of this problem, data has been transmitted uniformly by applying the same conditions without considering a state of each wireless link at all. Hence, there is a need in the art to solve at least the above-identified problems in the art.

SUMMARY OF THE INVENTION

Accordingly, the present invention has been made in part to solve at least some of the above-stated problems occurring in the prior art, and to provide some of the advantages described herein below. The present invention provides a method in which the reliability of data transfer can be guaranteed in consideration of a state of a wireless link in a WSN.

In order to accomplish this exemplary aspect of the present invention, there is provided a method for transmitting/receiving data in a Wireless Sensor Network (WSN), including the steps of: (a) ascertaining characteristics of data whose transfer is requested; (b) ascertaining a Link Quality Indication Value (LQIV); (c) determining a level of a link state in consideration of the characteristics of the data and the LQIV; and (d) controlling the link transfer of the data in consideration of the level of the link state.

Preferably, in step (c), the ascertained characteristics of data and LQIV are applied to, for example, a predetermined value, and a level corresponding to the result of the application is determined.

Preferably, in step (d), the number of times of data re-transfer, a length of a waiting time interval for a response of data transfer, and the number of data frames to be transmitted by duplicating original data can be controlled in consideration of the level of the link state determined in step (c).

More preferably, in step (a), characteristics of data are ascertained whose transfer is requested by an upper layer.

Also, step (b) includes the steps of: (b1) ascertaining an LQIV in a physical layer; and (b2) delivering the ascertained LQIV to a network layer.

More preferably, step (b1) is performed by request of the network layer requested to transmit data. Also, in steps (b1) and (b2), performing steps (b1) and (b2) is implemented in an initialization process of a network, the network layer temporarily stores the LQIV received from the physical layer, and the stored LQIV is checked as occasion demands.

Preferably, steps (c) and (d) are performed in the network layer.

In accordance with another exemplary aspect of the present invention, there is provided a module for transmitting/receiving data in a Wireless Sensor Network (WSN), including: a link level determination unit for predefining a level of a link state, depending on characteristics of data and a Link Quality Indication Value (LQIV), for ascertaining characteristics of data and an LQIV received from a lower layer, and for determining a level of a link state by applying the received characteristics of data and LQIV to the predefined level of the link state; and a link control unit for controlling the link transfer of the data in consideration of the determined level of the link state.

Preferably, the link level determination unit stores the number of times of data re-transfer equivalent to the predefined level of the link state, and the link control unit controls the number of times of data re-transfer by applying the determined level of the link state to the predefined level of the link state.

Preferably, the link level determination unit stores a length of a waiting time interval for data transfer equivalent to the predefined level of the link state, and the link control unit controls a length of a waiting time interval for data transfer by applying the determined level of the link state to the predefined level of the link state.

Preferably, the link level determination unit stores the number of data frames to be transmitted by duplicating original data, depending on the predefined level of the link state, and the link control unit controls the number of data frames to be transmitted by duplicating original data with the application of the determined level of the link state to the predefined level of the link state.

Preferably, the link level determination unit and the link control unit are provided to a network layer.

In addition, the link level determination unit checks a type of data received from an upper layer.

In addition, the link level determination unit receives an LQIV from a physical layer, and then checks a magnitude of the received LQIV.

More preferably, the link level determination unit is requested to transmit data by an upper layer, and then requests the physical layer to provide the LQIV in real-time, or the link level determination unit requests the LQIV in an initialization process of a network, temporarily stores the LQIV, and then checks the stored LQIV as occasion demands.

In accordance with a further exemplary aspect of the present invention, there is provided an apparatus for transmitting/receiving data, having a physical layer, a Medium Access Control (MAC) Layer, and a network layer in a Wireless Sensor Network (WSN). The apparatus includes: a module for transmitting and receiving data in the network layer thereof, the module including: a link level determination unit for predefining a level of a link state, depending on characteristics of data and a Link Quality Indication Value (LQIV) to store the predefined level of the link state, and for determining a level of a link state by applying characteristics of data and an LQIV received from the physical layer to the predefined level of the link state; and a link control unit for controlling the link transfer of the data in consideration of the determined level of the link state. The ascertained characteristics may include a type of data which indicates that data belonging to a data frame delivered by a high layer or lower layer corresponds to, for example, event-driven data, periodic data, or the rest.

BRIEF DESCRIPTION OF THE DRAWINGS

The above and other exemplary features, aspects, and advantages of the present invention will become more apparent from the following detailed description taken in conjunction with the accompanying drawings, in which.

DETAILED DESCRIPTION

Hereinafter, exemplary embodiments of the present invention will be described in detail with reference to the accompanying drawings. The next description includes particulars, such as specific configuration elements, which are only provided to facilitate more comprehensive understanding of the present invention, and it will be obvious to those of ordinary skill in the art that prescribed changes in form and modifications may be made to the particulars in the scope of the present invention. For the purposes of clarity and simplicity, a detailed description of known functions and configurations incorporated herein is omitted as it may make appreciation of the subject matter of the present invention unclear to a person of ordinary skill in the art.

An exemplary embodiment of the present invention corresponds to a representative example of a WSN, and exemplifies a WSN based on the IEEE 802.15.4 standard protocol.

Figure 1A:
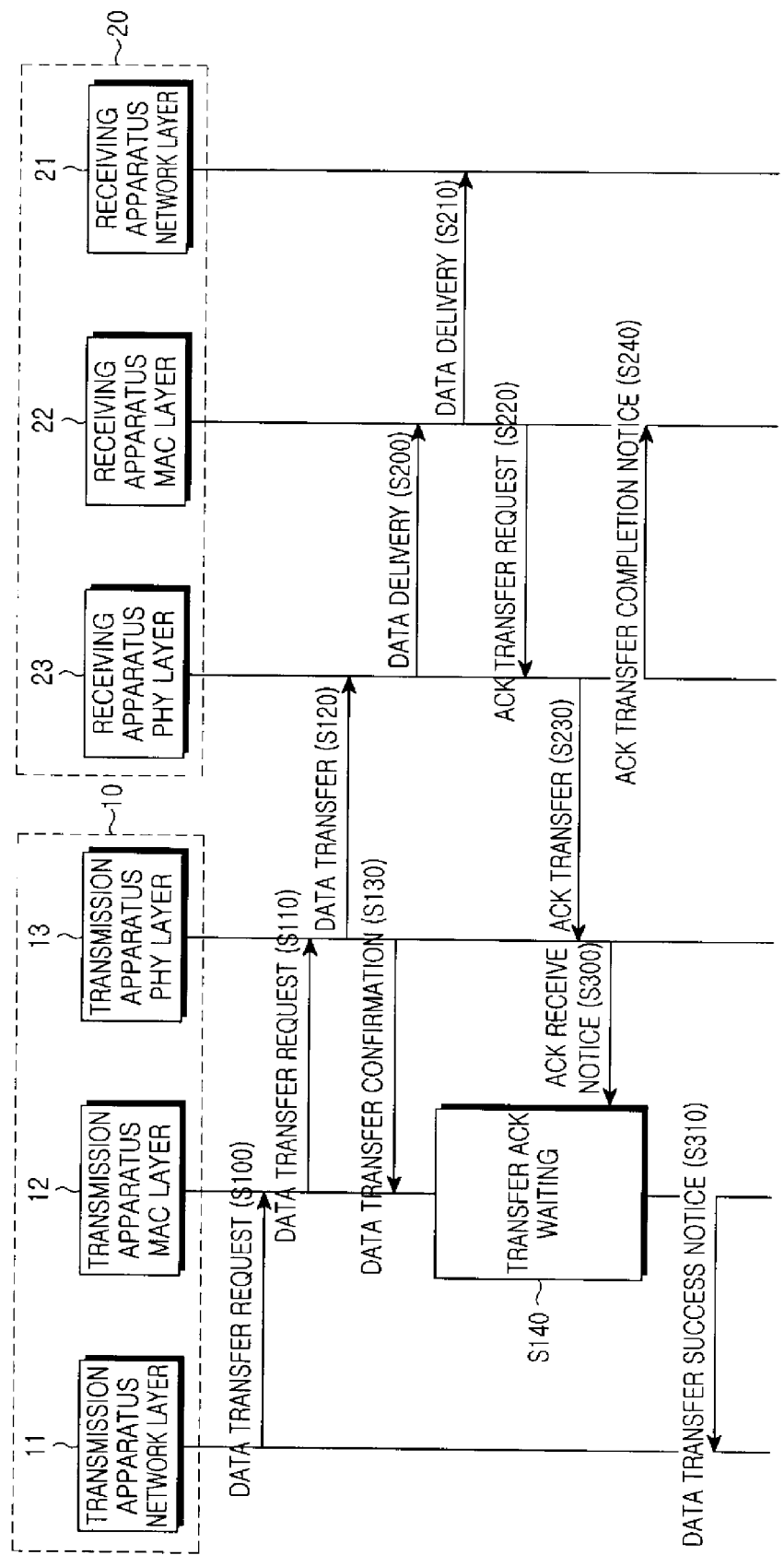
FIGS. 1A to 1C are flowcharts illustrating procedures of methods for transmitting data according to the prior art, respectively.
Figure 1B:
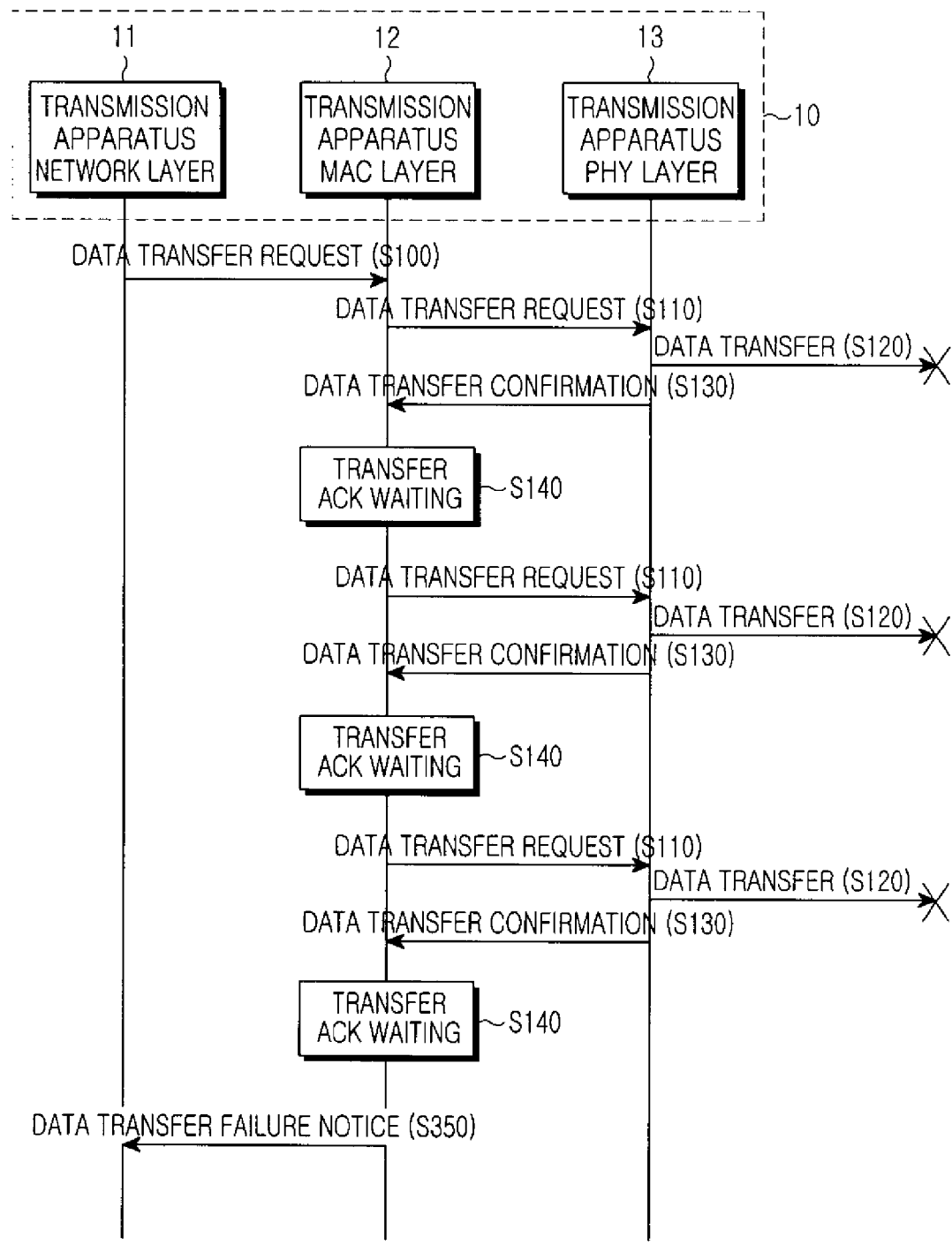
Figure 1C:
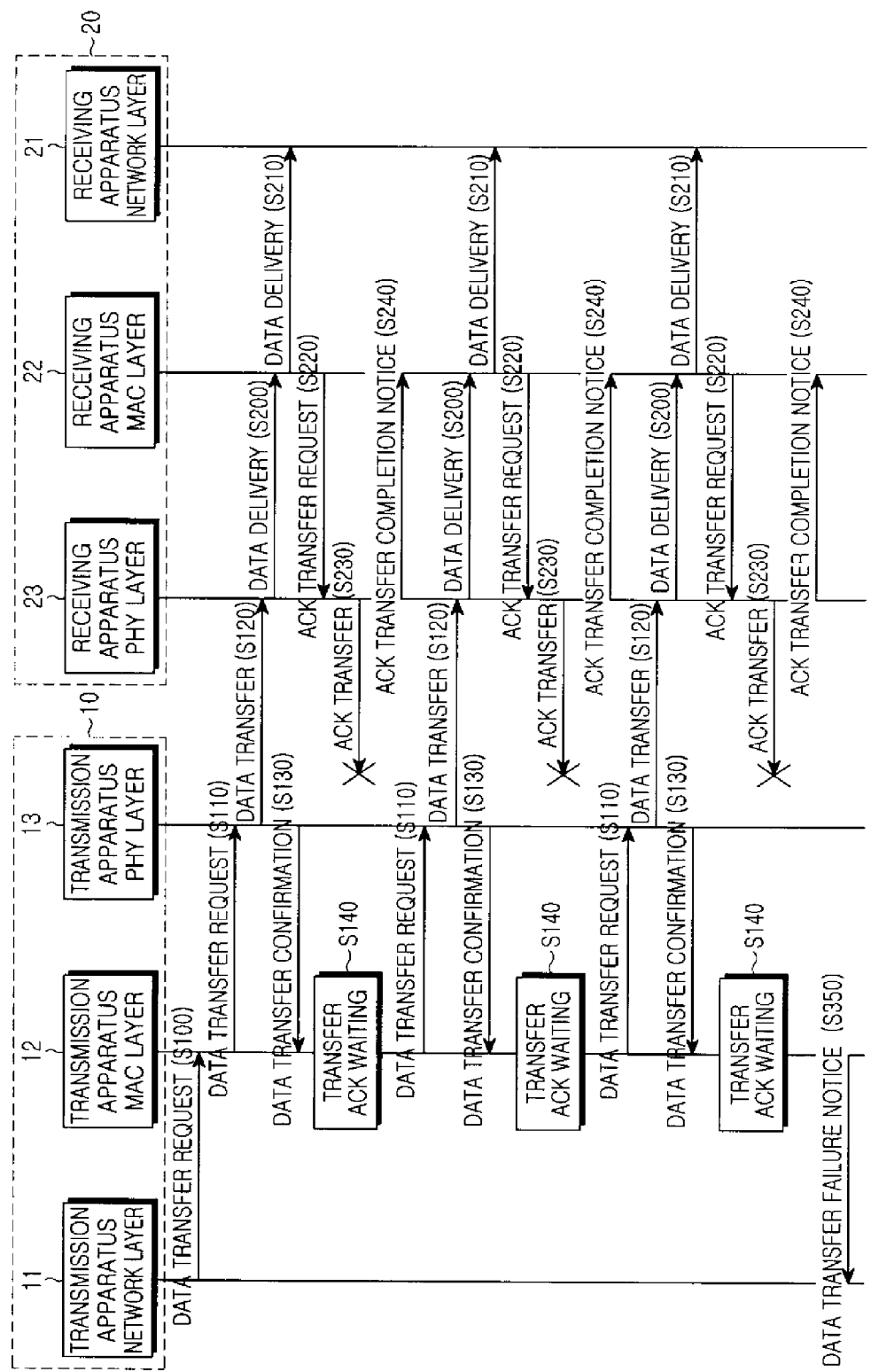
Figure 2:
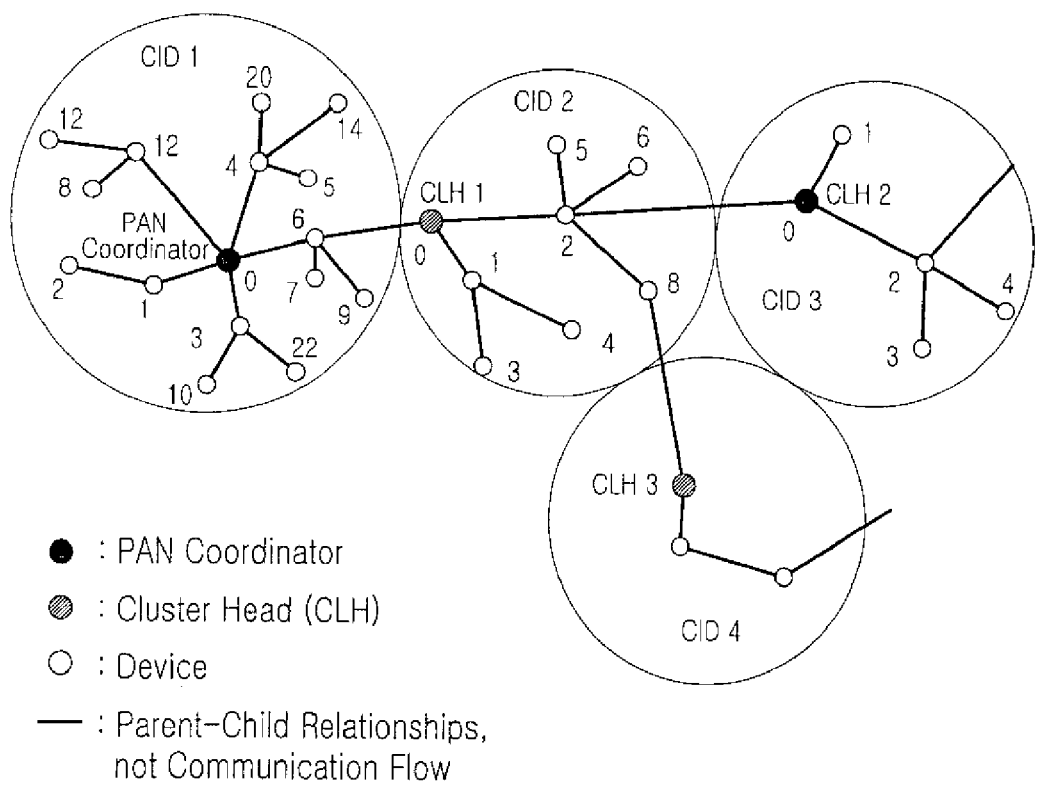
FIG. 2 is a conceptual view illustrating the network structure of a WSN based on the IEEE 802.15.4 standard protocol according to an exemplary embodiment of the present invention.

First, in accordance with FIG. 2, in order to examine the network structure of the WSN based on the IEEE 802.15.4 standard protocol according to an exemplary embodiment of the present invention, the WSN according to is the example shown and described is typically constructed in a network structure having a multi cluster form in which a star topology and a peer-to-peer topology are combined. Specifically, the WSN according to this exemplary embodiment includes: a first cluster CID1 realized with a Personal Area Network (PAN) coordinator as the center; a second cluster CID2 which includes a first cluster hub CLH1 linked to a device included in the first cluster CID1, and is realized with the first cluster hub CLH1 as the center; a third cluster CID3 which includes a second cluster hub CLH2 linked to a device included in the second cluster CID2, and is realized with the second cluster hub CLH2 as the center; and a fourth cluster CID4 which includes a third cluster hub CLH3 linked to the second cluster CID2, and is realized with the third cluster hub CLH3 as the center.

Still referring to FIG. 2, the above multi-cluster is formed with the PAN coordinator as the center. In the first place, if the PAN coordinator forms the first cluster CID1 by performing functions, including network settings, beacon transfer, node management, node information storage, and message route setting between connected nodes, devices included in the first cluster CID1 scan a specified channel list so as to check a usable communication channel. Then, if a Wireless Personal Area Network (WPAN) IDentification (ID) which is not duplicate is selected following the completion of scanning, a Full Function Device (FFD) which can directly transmit/receive data functions as the first cluster hub CLH1. Thereafter, if the first cluster hub CLH1 transmits a beacon frame to other devices, the devices all of which receive the beacon frame are linked to the first cluster hub CLH1, and then form the second cluster CID2. By repeating the aforementioned process, the third and the fourth clusters CID3 and CID4 are embodied, and finally, one WSN is formed.

Figure 3:
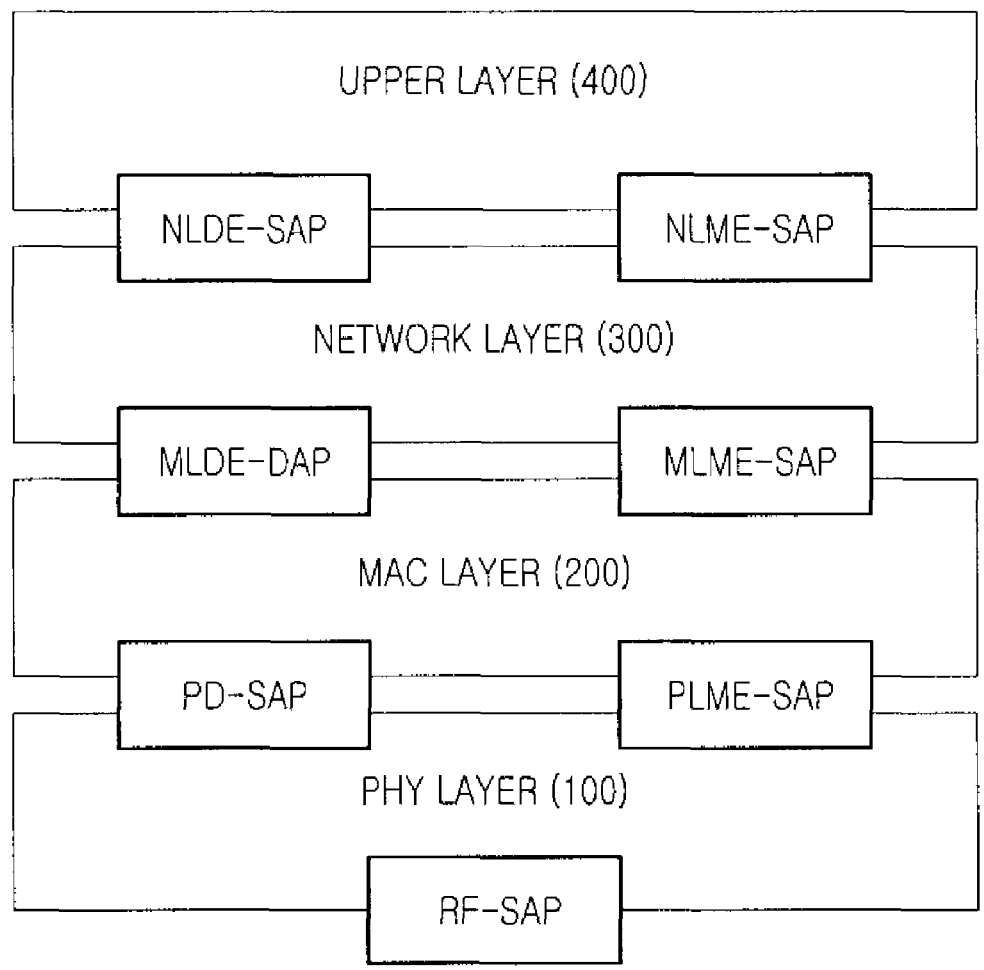
FIG. 3 is a conceptual view illustrating the structure of a stack of an apparatus for transmitting/receiving data provided to a WSN according to an exemplary embodiment of the present invention.

FIG. 3 corresponds to a view according to an exemplary embodiment of the present invention, and illustrates the structure of a stack of an apparatus for transmitting/receiving data provided to the WSN. Now referring to FIG. 3, the exemplary apparatus for transmitting/receiving data includes a PHYsical (PHY) layer 100, a Medium Access Control (MAC) layer 200, a network layer 300, and an upper layer 400. The physical layer 100 corresponds to an interface that connects the MAC layer 200 with a wireless channel, and provides a PHY data service that transmits/receives a data frame, and a PHY management service that sets a communication environment of a wireless domain. As the PHY data service, the physical layer 100 is requested to transmit a data frame by the MAC layer 200, and then transmits a packet of the PHY layer, i.e. a PHY Protocol Data Unit (PPDU), to a receiving apparatus via a wireless channel. Then, the PHY layer 100 delivers a confirmation message in regard to the transfer of the data frame to the MAC layer 200. Also, the PHY layer 100 receives a transfer ACKnowledgement (ACK) frame from the receiving apparatus, and then informs the MAC layer 200 that the data has been successfully transmitted. Additionally, as the PHY management service, the PHY layer 100 performs activation or deactivation of a wireless domain requested by the MAC layer 200, performs Channel Clear Assignment (CCA), detects energy of the wireless channel, and checks a link state of the wireless channel. Furthermore, the PHY layer 100 is connected with the wireless channel via a Radio Frequency-Service Access Point (RF-SAP), and is connected with the MAC layer 200 via a PHY Data-Service Access Point (PD-SAP) and a PHY Layer Management Entity-Service Access Point (PLME-SAP).

Still referring to FIG. 3, the MAC layer 200 corresponds to an interface that connects the PHY layer 100 with the network layer 300, and provides an MAC data service that transmits/ receives an MAC data frame, and an MAC management service that sets a communication environment. As the MAC data service, the MAC layer 200 is requested to transmit a data frame (e.g., a Network Service Data Unit (NSDU)) by a higher layer, i.e. the network layer 300, generates data of the MAC layer (i.e., an MAC Protocol Data Unit (MPDU)), and then delivers the generated MPDU to the PHY layer 100. Then, the MAC layer 200 provides the network layer 300 with a confirmation message in regard to the transfer of the data frame and the result in regard to the transfer of the data frame that the PHY layer 100 has reported to the MAC layer 200. As the MAC management service, the MAC layer 200 sets an environment in which it is suitable for the PHY layer 100 to transmit a data frame to each of neighbor nodes. On this end, the MAC layer 200 transmits the control value necessary to set an environment to the PHY layer 100, and then receives a response accompanied by the control result. Specifically, the MAC layer 200 generates a beacon, and also produces a control signal necessary to synchronize the generated beacon. Thereafter, the MAC layer 200 controls an association and disassociation of a WPAN, and then sets an environment in which a Carrier Sense Multiple Access/Collision Avoidance (CSMA/CA) mechanism and a Global Telecommunication System (GTS) mechanism can be performed. Furthermore, the MAC layer 200 is connected with the network layer 300 (i.e., a higher layer) via an MAC Common Part Sublayer-Service Access Point (MCPS-SAP), and is connected with the PHY layer 100 (i.e., a lower layer) via a PHY Data Service Access Point (PD-SAP), thereby performing the MAC data service. In addition, the MAC layer 200 is connected with the network layer 300 (i.e., a high layer) via an MAC Layer Management Entity-Service Access Point (MLME-SAP), and is connected with the PHY layer 100 (i.e., a lower layer) via a PHY Layer Management Entity-Service Access Point (PLME-SAP), thereby performing the MAC management service.

The network layer 300 provides a network data service that transmits/receives a data frame, and a network management service that sets a communication environment. The network data service generates a data frame of the network layer (i.e., a Network Packet Data Unit (NPDU)) by using a data frame delivered from a higher layer, and then delivers the generated NPDU to the MAC layer 200. The network management service provides the function of generating the control value necessary to find routes of a receiving-end and then set a route thereof.

In addition, the network management service generates the control value necessary to manage a transmit/receive apparatus which attempts to enter a network, or a transmit/receive apparatus which tries to leave the network. Also, when a transmit/receive apparatus functions as a cluster hub, the network data service performs the function for assigning the address values of transmit/receive apparatuses existing within the network.

In particular, the network layer 300 is equipped with a data transfer module including a link level determination unit and a link control unit. The link level determination unit requests the MAC layer 200 to provide a Link Quality Indication Value (LQIV), and then receives the LQIV. Then, the network layer 300 checks a type of data which indicates that data belonging to a data frame delivered by a higher layer or a lower layer corresponds either to event-driven data, to periodic data, or to the rest. Additionally, in consideration of the results (i.e., the LQIV and the type of data), the network layer 300 determines a link level corresponding to those results. The link control unit considers the link level determined by the link level determination unit, and then generates the control value corresponding to the determined link level.

Herein, the above control value can include the value necessary to set waiting time for which the MAC layer 200 waits until the reception of a response.

When a link state is unstable, the time required until the reception of an ACK frame can increase. Thus, if a prescribed waiting time is arbitrarily set without regard to a link state, because the waiting time is too short, the ACK frame can be received after the expiration of the waiting time, and a situation can occur in which unnecessary data is retransmitted even though the ACK frame has been received. In contrast, if the link state is stable, following the transfer of a data frame, the ACK frame can be received within a short amount of time. However, if a prescribed waiting time is arbitrarily set without regard to the link state, a situation can occur in which the MAC layer 200 waits for an unnecessary until the expiration of the waiting time interval even though the ACK frame has already been received. Hence, if the waiting time is controlled in consideration of the LQIV and a type of data, both the transfer of unnecessary data and the transfer delay caused by unnecessary waiting time can be prevented. With this control, it is effective in that electric power required for data transmit/receive can be reduced.

Further, the above control value can include the value necessary to control the number of times for data re-transfer. Also, the above control value can include the value necessary to control the number of data frames to be transmitted by duplicating original data during data transfer. If a link state is unstable, the probability of failure in data transfer is relatively higher when compared with the case of a stable link state. Therefore, if the number of times of data re-transfer and the number of data frames to be transmitted with the duplication of original data increases, relatively stable data transfer can be implemented as compared with a case where a predetermined number of times of data re-transfer and a predetermined number of data frames to be transmitted with the duplication of original data are arbitrarily defined without regard to a link state.

Hereinafter, a description will be made in detail of a method for transmitting data according to an exemplary embodiment of the present invention. Above all, so that each device may transmits/receives data, each device must be connected and synchronized with one another via a wireless channel, and a WSN must be formed by assigning an address thereof to each device. In an exemplary embodiment of the present invention, it is assumed that the WSN is formed by a method proposed in the IEEE 802.15.4 protocol or the Zigbee protocol. Also, it is exemplified that the WSN includes an exemplary apparatus for transmitting/receiving data, capable of routing, (e.g., a coordinator or a router), and each of those devices (e.g., nodes having the capabilities of routing) stores a route table in which relations with peripheral devices are stored.

Figure 4:
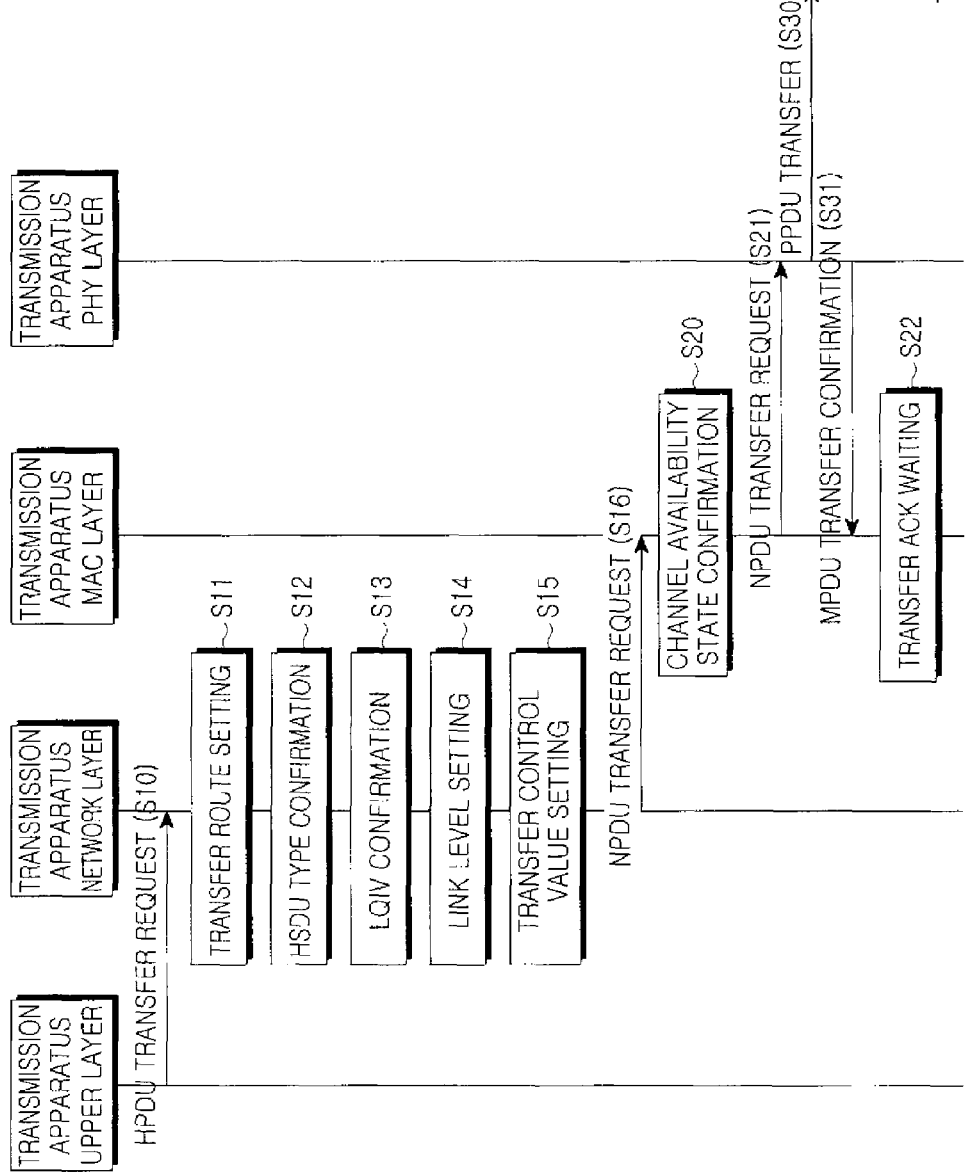
FIG. 4 is a flowchart illustrating the procedure of a data transfer process of a method for transmitting/receiving data according to an exemplary embodiment of the present invention.
Figure 5:
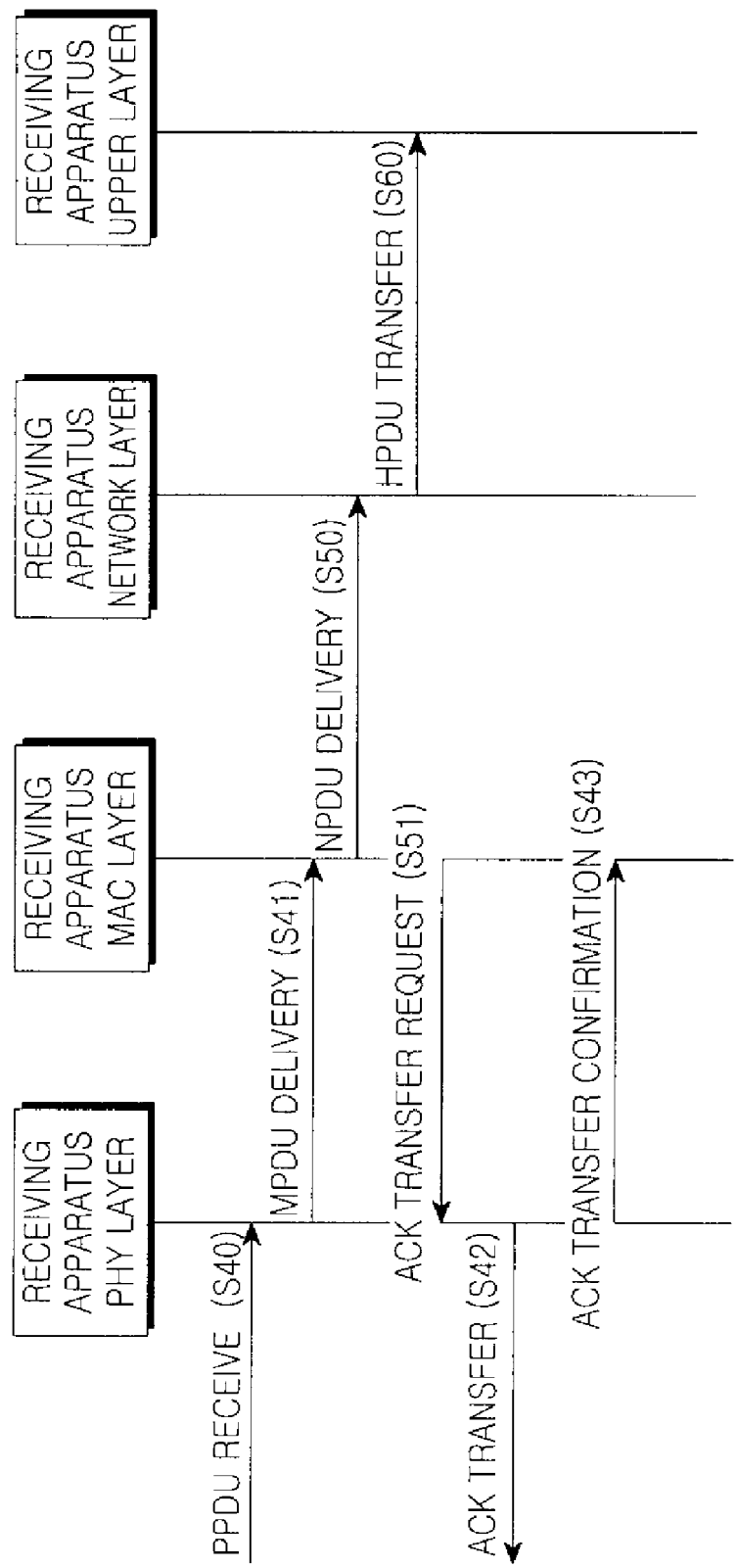
FIG. 5 is a flowchart illustrating the procedure of a data receive process of a method for transmitting/receiving data according to an exemplary embodiment of the present invention.
Figure 6:
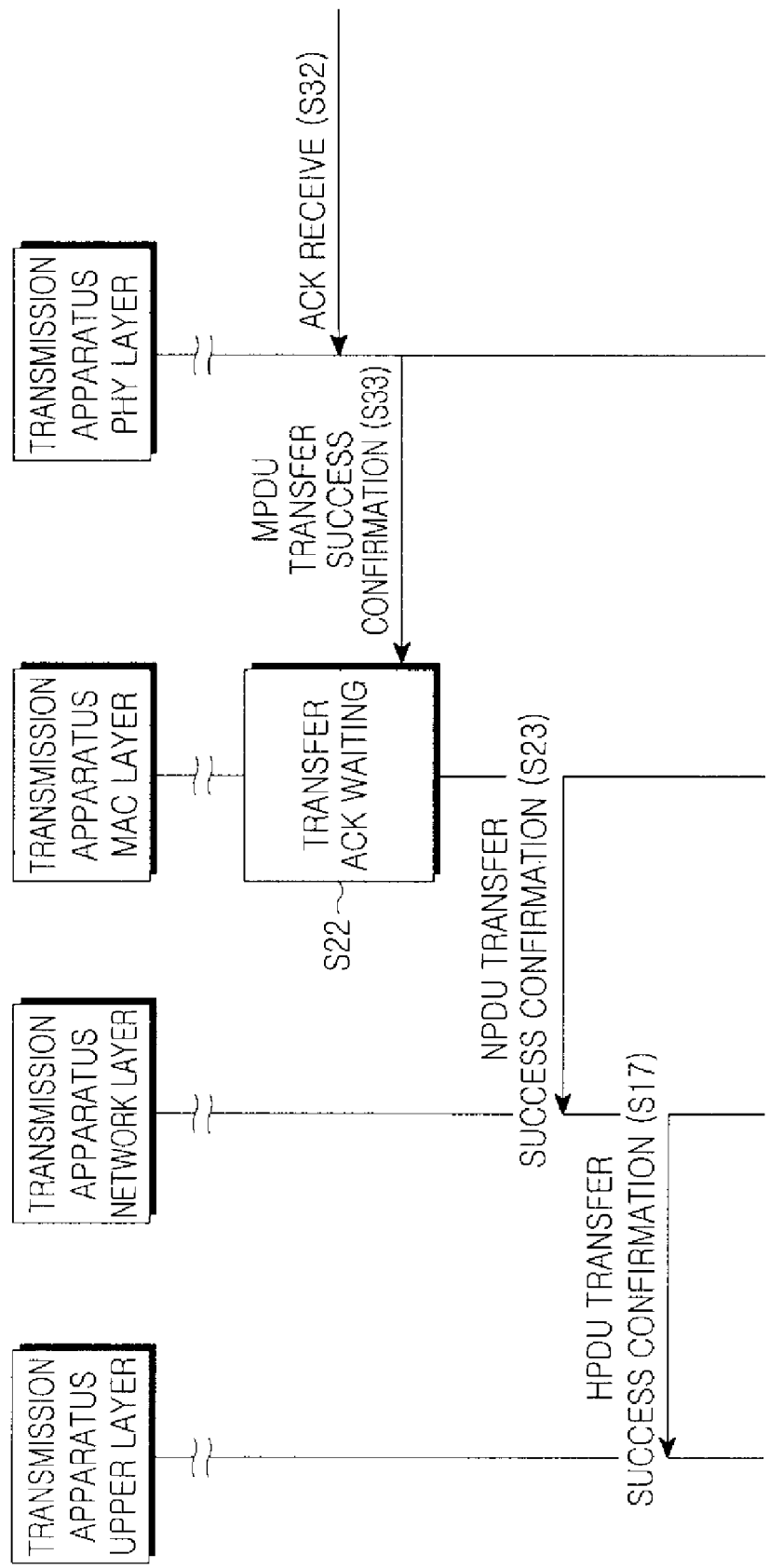
FIG. 6 is a flowchart illustrating a procedure for processing data on receiving an ACK in a method for transmitting/receiving data according to an exemplary embodiment of the present invention.
Figure 7:
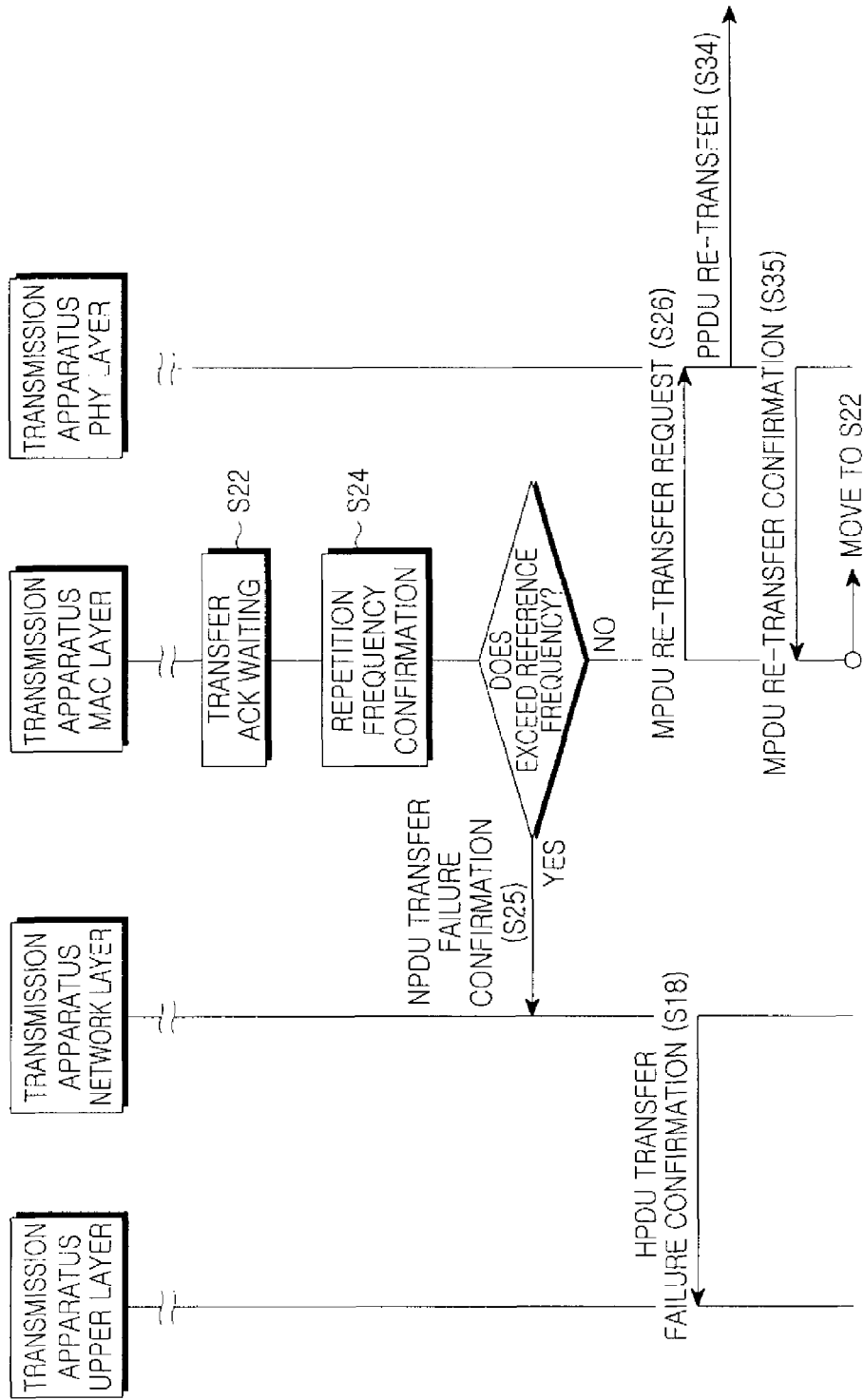
FIG. 7 is a flowchart illustrating a procedure for processing data, responding to a case where an ACK is not received in a method for transmitting/receiving data according to an exemplary embodiment of the present invention.

FIG. 4 is a flowchart illustrating an exemplary data transferring process for an apparatus for transmitting/receiving data according to an embodiment of the present invention. FIG. 5 is a flowchart illustrating an exemplary data receiving process of an apparatus for transmitting/receiving data according to the present invention. FIG. 6 is a flowchart illustrating an exemplary procedure for processing data on receiving an ACK in an apparatus for transmitting/receiving data. FIG. 7 is a flowchart illustrating an exemplary procedure for processing data, responding to a case where an ACK is not received in an apparatus for transmitting/receiving data.

First, in a state in which a network is formed, if a network layer of the apparatus for transmitting/receiving data which acts as a transmission apparatus is requested to transmit a data frame (i.e., a Next Higher layer Protocol Data Unit (HPDU)) by an upper network (step S10), it sets a transfer route (step S11).

In more detail, in step S11 if a route to a destination is not defined in a route table possessed by a current transmission apparatus, the network layer transmits a route request instruction frame to a neighbor device until it find out a device which knows the destination or a route to the destination. Then, a device which has received the route request instruction frame checks a route table possessed by the device itself, and then ascertains if a request route is defined in the route table thereof. Thereafter, the device generates an instruction frame representing a route reply, and then transmits the generated instruction frame back to a device which has requested route search. Further, if multiple routes exist as the route to the destination, the device which has received the route request instruction frame computes link costs among devices, and then selects a route whose cost is the lowest. In addition, a newly made entry in regard to the route set as above is stored in a route search table of each of all devices from a device initiating route search to a final reply device, which exists within the route.

While a method for finding a transfer route to a destination by using a device which stores a route table is exemplified as a method for setting a transfer route in an embodiment of the present invention, the present invention is not limited to this, and it goes without saying that various routing methods used in communication protocols can be applied to exemplary embodiments of the present invention. For example, as a method for setting a transfer route, a hierarchical routing method can be used. Namely, after a network layer of a transmission apparatus checks a destination address included in a data frame and ascertains if a destination exists within an address part block thereof, the network layer of the transmission apparatus delivers the address to a device of a lower layer. If that happens, the device of the lower layer repeats a process in which it checks again if the above address exists within an address part block thereof, and then delivers the address to a subordinate device. Finally, a route to the destination can also be formed.

Also, so as to exemplify a method for setting a transfer route by using a route table in an exemplary embodiment of the present invention, while it is exemplified that a WSN typically includes devices having the capability of routing (e.g., a coordinator or a router), and each of those devices (i.e., the devices capable of routing) stores a route table in which relations with peripheral devices are stored, the present invention is not limited to this method operation. A person of ordinary skill in the art can appreciate that the spirit of the invention and scope of the appended claims includes methods for setting a transfer route, a WSN and configuration elements included therein can be replaced with other configuration elements in addition to the examples of what is shown and described herein.

In step S12, a data frame (e.g., HPDU) delivered from the upper layer is checked, and then a type of a data unit (e.g., a next Higher layer Service Data Unit (HSDU)) included in the HPDU is confirmed. For instance, if the upper layer defines a type of data of the HPDU and then delivers the HPDU to the network layer, the network layer checks a frame format of the HPDU, and then confirms a type of the HSDU. At this time, the upper layer directly defines a type of data in the frame format of the HPDU and then transmits the HPDU, or checks a type defined in a frame format and can then ascertain a kind corresponding to the defined type. For example, the above data type can correspond to either 'event-driven', 'on-demand', 'periodic', or the rest.

In step S13, a link state of a wireless channel of the route which has been set is checked. For example, in an initialization process of a network, the PHY layer measures the LQIV, and then delivers the result of the measurement to the MAC layer. Accordingly, it is preferable that the network layer receives the LQIV from the MAC layer to temporarily store the received LQIV, and as occasion demands, confirms the LQIV selectively, i.e. in a process for performing step S13.

Although in the example shown and described the LQIV measured in an initialization process is temporarily stored and then selectively confirms the above LQIV as a method for checking an LQIV, the present invention is not limited to measurement of the LQIV as shown and described. For instance, it is also possible that, in step S13, the MAC layer is requested to measure an LQIV in real time as occasion arises, and then confirms the LQIV received in reply to the request of the measurement. If the type of the HSDU and the LQIV are confirmed through steps S12 and S13, the network layer applies the confirmed type of the HSDU and the LQIV to a predetermined value, and then sets a link level reflected in a the transfer of a data frame (step S14). Additionally, the predetermined value can be determined as exemplified in TABLE 1. The LQIV can be an integer between 0 to 255. Also, in the table 1 the low LQI value can be an integer between 0 to 100, the medium LQI value can be an integer between 101 to 200, and the high LQI value can be an integer between 201 to 255. Although in the example the LQVI is integer between 0 to 255 and the low LQI value, the medium LQI value, and the high LQI value is integer within a above mentioned range respectively, the present invention is not limited to the LQVI. It is also possible that the LQVI can be modified multifariously according to a network environment, a power of a network device, or application program.

For example, if the type of the HSDU confirmed in step S12 corresponds to 'on-demand' (i.e., an ACK frame), and if the LQIV confirmed in step S13 has a low-level value (i.e., a low Link Quality Indication (LQI)), in step S14, the third link level can be determined as a link level.

TABLE 1

ADAPTIVE LINK TABLE

| application | LQI value | | |
|---|---|---|---|
| feature | high LQI | medium LQI | low LQI |
| event-driven | link level 2 | link level 3 | link level 3 |
| on-demand | link level 2 | link level 2 | link level 3 |
| Periodic | link level 1 | link level 2 | link level 3 |

In step S15, corresponding to the link level determined in step S14, a control value necessary to transmit a data frame is determined, and then, the determined control value is delivered to the MAC layer.

Preferably with regard to the control value determined in step S15, there includes waiting time, and the number of times of re-transfer, as well as the number of data frames to be transmitted with duplication; more particularly, the control values may correspond to either any one, or two or more units of waiting time, the number of times of re-transfer, and the number of data frames to be transmitted with duplication.

Specifically, in step S15, the link level determined in step S14 is applied to a predetermined value exemplified in TABLE 2, and then, a control value (e.g., a predetermined waiting time, the number of times of re-transfer, and the number of data frames to be transmitted with duplication) corresponding to the determined link level can be determined. Namely, if the link level determined in step S14 corresponds to a level which indicates that a link state is unstable (i.e., MDR L3), in step S15, the waiting time is set to '120', the number of times of re-transfer is set to 'five times', and the number of data frames to be transmitted with duplication can be set to '2.'

TABLE 2

ADAPTIVE TRANSMISSION TABLE

|  | wait duration | retries | Action |
| --- | --- | --- | --- |
| MDR L1 | 27 | 2 | None |
| MDR L2 | 54 | 3 | none |
|  | (802.15.4) | (802.15.4) | (802.15.4) |
| MDR L3 | 120 | 5 | two copies |

Next, the network layer transmits, to the MAC layer, a data frame (e.g., an NPDU) including the control value set in step S15, and then requests the MAC layer to transmit the data frame to the receiving apparatus (step S16). If that happens, the MAC layer checks a state of the PHY layer, and then confirms an availability state of a channel connected with the receiving apparatus (step S20). Step S20 can include a process in which the MAC layer controls an operation mode (e.g., a transmit mode, a receive mode, etc.) of the PHY layer, and a process in which the MAC layer requests the PHY layer to provide Channel Clear Assignment (CCA).

Still referring to FIG. 4, following step S20, the MAC layer delivers a data frame (e.g., an MPDU) to the PHY layer, and then requests the PHY layer to transmit the data frame to the receiving apparatus (step S21). Then, the PHY layer generates a data frame (i.e., a PPDU), including the data frame delivered as above and a PHY header, to transmit the generated PPDU to the receiving apparatus (step S30), and informs the MAC layer that the data frame (the PPDU) has been transmitted.

The MAC layer which has confirmed the transfer of the data frame (the PPDU) on the basis of the above notice from the PHY layer, refers to the waiting time included in the control value received in step S16, and then waits for a reply generated from the receiving apparatus during a time interval equivalent to the waiting time.

Meanwhile, FIG. 5 is a flowchart illustrating a process in which a receiving apparatus according to another exemplary embodiment of the present invention receives data. Hereinafter, the data receive process according to an embodiment of the present invention will be examined with reference to FIG. 5.

First, a PHY layer of the receiving apparatus receives the data frame (i.e., the PPDU) from the transmission apparatus (step S40), and checks the received data frame to deliver an MPDU to an MAC layer of the receiving apparatus (step S41). If that happens, the MAC layer confirms the MPDU to deliver an NPDU to a network layer again (step S50), and requests the PHY layer to transmit an ACK frame (step S51). Also, the network layer to which the NPDU has been delivered by the MAC layer, checks the above data frame (the NPDU), and then delivers an HPDU to an upper layer (step S60). In the meantime, the PHY layer which has been requested to transmit the ACK frame, transmits the ACK frame to the transmission apparatus (step S42), and then informs the MAC layer that the ACK frame has been transmitted (step S43).

If a connection state of a wireless channel between the transmission apparatus and the receiving apparatus is stable, as illustrated in FIGS. 4 and 5, data transmitted from the transmission apparatus is delivered to the receiving apparatus, and the ACK frame transmitted from the receiving apparatus can be delivered to the transmission apparatus. On the contrary, if a connection state of a wireless channel between the transmission apparatus and the receiving apparatus is unstable, a data frame transmitted from the transmission apparatus is not delivered to the receiving apparatus. Alternatively, even when the data frame is delivered to the receiving apparatus, the ACK frame may not be delivered to the transmission apparatus.

FIG. 6 is a flowchart illustrating a process in which a transmission apparatus according to an exemplary embodiment of the present invention processes data in response to the reception of an ACK frame. FIG. 7 is a flowchart illustrating a process in which a transmission apparatus according to an exemplary embodiment of the present invention processes data in response to a case where an ACK frame is not received. Namely, FIG. 6 depicts a state in which a connection state of a wireless channel between the transmission apparatus and the receiving apparatus is stable, and illustrates a process after the transmission apparatus receives the ACK frame. FIG. 7 depicts a state in which a connection state of a wireless channel between the transmission apparatus and the receiving apparatus is unstable, and illustrates an exemplary operation of a case where the transmission apparatus cannot receive the ACK frame.

In FIG. 6, the PHY layer of the transmission apparatus receives the ACK frame from the receiving apparatus (step S32), and then informs the MAC layer, which waits for a reply to transfer, that the data frame (i.e., the MPDU) has been successfully transmitted (step S33). Then, the MAC layer informs the network layer that the data frame (i.e., the NPDU) has been successfully transmitted (step S23), and the network layer informs the upper layer again that the data frame (i.e., the HPDU) has been successfully transmitted (step S17).

On the other hand, as shown in FIG. 7, if, in such a state that the MAC layer of the transmission apparatus cannot receive the ACK frame from the receiving apparatus, waiting time for which the MAC layer of the transmission apparatus is expected to receive a transfer ACK expires, the MAC layer checks the number of re-transfer attempts that correspond to the control value received in step S16 (step S24). If it is determined as a result of performing step S24 that all of the number of times of re-transfer attempts directed by the above control value has been tried, the MAC layer informs the network layer that the transfer of the data frame (i.e., the NPDU) has failed (step S25). Then, the network layer informs the upper layer again that the transfer of the data frame (i.e., the HPDU) has failed (step S18). In the meantime, if, as a result of performing step S24, the quantity of transfer attempts does not exceed the quantity of re-transfer attempts directed by the above control value, the MAC layer requests the PHY layer to retransmit the data frame (i.e., the MPDU) (step S26). In such a case, the PHY layer transmits the data frame (i.e., the PPDU) to the receiving apparatus (step S34), and then informs the MAC layer again that the data frame (i.e., the PPDU) has been transmitted to the receiving apparatus (step S35). Thereafter, the MAC layer repeats a step of waiting for a transfer ACK during waiting time included in the control value (step S22).

Also, in the process of repeating step S22, if the ACK frame is received from the receiving apparatus, steps S23 and S17 described in FIG. 6 are performed, and if the ACK frame is not received for waiting time, step S24 is performed. After that, depending on the result of step S24, steps selected among steps S25, S26, S34, S35, and S18 are performed.

Figure 8:
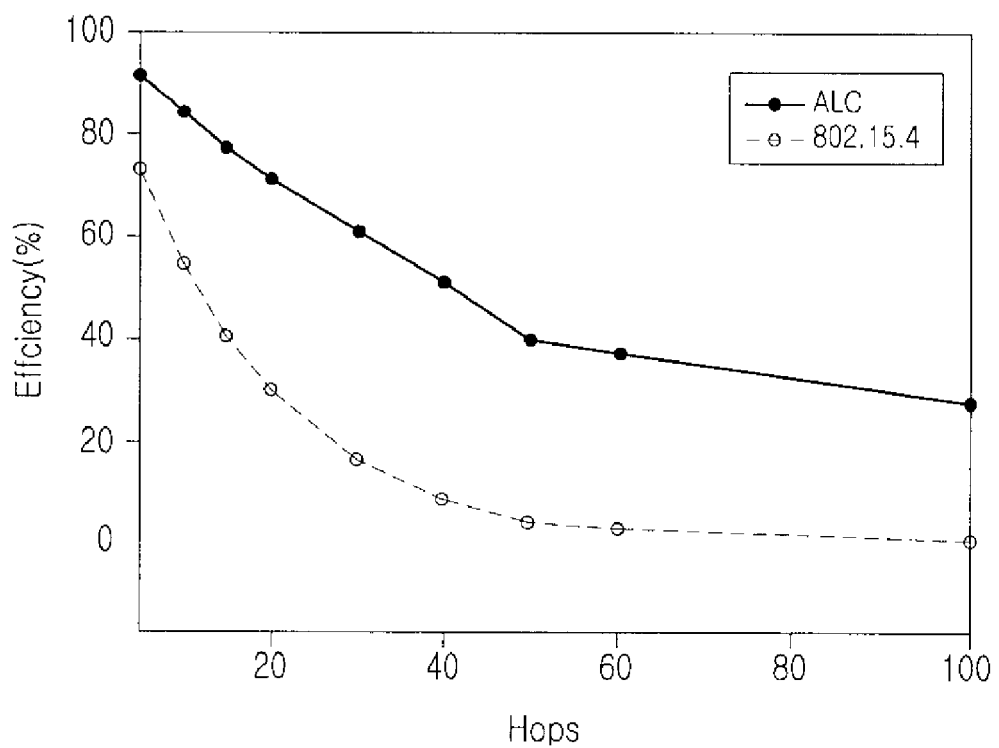
FIG. 8 is a graph illustrating the test results of a method for transmitting/receiving data according to an exemplary embodiment of the present invention.

FIG. 8 is a graph illustrating the test results of a method for transmitting/receiving data according to an exemplary embodiment of the present invention.

As a comparative example, FIG. 8 shows the transfer efficiency for data being transmitted through a method for transmitting/receiving data, proposed in the IEEE 802.15.4 protocol. At this time, a transmission error rate is set to 0.01%, and, while the number of nodes between the transmission apparatus and the receiving apparatus is varied from '3' to '100', data transfer efficiency is measured for one hour. In addition, the measured data transfer efficiency is shown in a dotted line of a graph.

Meanwhile, in an exemplary embodiment of the present invention, data is transmitted through a method for transmitting/receiving data according conditions as described in the above comparative example, and while the number of nodes between a transmission apparatus and a receiving apparatus varies from '3' to '100', data transfer efficiency is measured for one hour. In addition, the measured results are shown in a solid line of a graph.

Referring to FIG. 8, it can be confirmed that transfer efficiency is relatively and remarkably higher in the exemplary embodiment of the present invention when compared with the comparative example proposed in the IEEE 802.15.4 protocol. Thus, if data is transmitted/received with a suitable link state of a wireless channel and a suitable type of data in the method for transmitting/receiving data according to the present invention, the data can be stably delivered to the receiving apparatus, and the transfer efficiency can also be increased significantly.

While it is exemplified that a WSN is formed in a method proposed in the IEEE 802.15.4 protocol or the Zigbee protocol in an embodiment of the present invention, the present invention is not limited to this, if a WSN for data transmit/receive is embodied, that will do.

The merits and effects of exemplary embodiments, as disclosed in the present invention, and as so configured to operate above, will be described as follows.

As described above, in a method for transmitting/receiving data according to the present invention, considering link states of wireless channels and types of data, data can be delivered to a receiving apparatus, and data transfer efficiency can also be raised. Furthermore, an unnecessary waiting time, an unnecessary number of times of re-transfer, and the like can be controlled in consideration of link states and types of data, and accordingly, electric power required in data transfer can be reduced.

While the invention has been shown and described with reference to certain exemplary embodiments thereof, it will be understood by those skilled in the art that various changes in form and details may be made therein without departing from the spirit and scope of the invention. Therefore, the spirit of the present invention and the scope of the appended claims are not limited to the exemplary embodiments thereof.

What is claimed is:

1. A method for transmitting/receiving data in a Wireless Sensor Network (WSN), the method comprising the steps of:
   (a) ascertaining characteristics of data whose transfer is requested;
   (b) ascertaining a Link Quality Indication Value (LQIV);
   (c) determining a level of a link state based on the characteristics of the data and the LQIV; and
   (d) controlling the link transfer of the data based on the determined level of the link state by generating a control value corresponding to the determined level of the link state in which the control value includes a value necessary for setting a wait time for reception of a response.

2. The method as claimed in claim 1, wherein step (c) includes applying the ascertained characteristics of data and LQIV to a predetermined value, and determining the level of the link state corresponding to the result of the application.

3. The method as claimed in claim 1, wherein, in step (d), the number of times that data transfer is attempted is controlled based on the level of the link state determined in step (c).

4. The method as claimed in claim 1, wherein, in step (d), a length of a waiting time interval for a response of data transfer is controlled based on the level of the link state determined in step (c).

5. The method as claimed in claim 1, wherein, in step (d), the number of data frames to be transmitted is controlled by duplicating original data based on the level of the link state determined in step (c).

6. The method as claimed in claim 1, wherein, in step (a), characteristics of data whose transfer is requested by an upper layer are ascertained.

7. The method as claimed in claim 6, wherein step (b) comprises the steps of:
   (b1) ascertaining an LQIV in a physical layer; and
   (b2) delivering the ascertained LQIV to a network layer.

8. The method as claimed in claim 7, wherein step (b1) is performed by request of the network layer requested to transmit data.

9. The method as claimed in claim 7, wherein, steps (b1) and (b2) are implemented in an initialization process of a network, the network layer temporarily storing the LQIV received from the physical layer, and the stored LQIV is checked upon demand.

10. The method as claimed in claim 6, wherein steps (c) and (d) are performed in the network layer.

11. The method as claimed in claim 1, wherein the characteristics of data include a type of data which indicates event-driven data, on-demand data, or periodic data.

12. An apparatus for transmitting/receiving data in a Wireless Sensor Network (WSN), the apparatus comprising:
   a link level determination unit for predefining a level of a link state, wherein the link state depends upon characteristics of data and a Link Quality Indication Value (LQIV), and said link level determination unit for ascertaining characteristics of data and an LQIV received from outside the WSN, and for determining a level of a link state by applying the received characteristics of data and LQIV to the predefined level of the link state; and
   a link control unit for controlling the link transfer of the data in consideration of the determined level of the link state by generating a control value corresponding to the determined level of the link state in which the control value includes a value necessary for setting a wait time for reception of a response.

13. The apparatus as claimed in claim 12, wherein the link level determination unit stores the number of times of attempted data transfer equivalent to a predefined level of the link state, and the link control unit controls the number of times of attempted data transfer by applying the determined level of the link state to the predefined level of the link state.

14. The apparatus as claimed in claim 12, wherein the link level determination unit stores a length of a waiting time interval for data transfer equivalent to a predefined level of the link state, and the link control unit controls a length of a waiting time interval for data transfer by applying the determined level of the link state according to the predefined level of the link state.

15. The apparatus as claimed in claim 12, wherein the link level determination unit stores the number of data frames to be transmitted by duplicating original data, depending on a predefined level of the link state, and the link control unit controls the number of data frames to be transmitted by duplicating original data with the application of the determined level of the link state to the predefined level of the link state.

16. The apparatus as claimed in claim 12, wherein the link level determination unit and the link control unit are provided to a network layer.

17. The apparatus as claimed in claim 16, wherein the link level determination unit checks a type of data received from an upper layer.

18. The apparatus as claimed in claim 16, wherein the link level determination unit receives an LQIV from a physical layer, and checks a magnitude of the received LQIV.

19. The apparatus as claimed in claim 18, wherein the link level determination unit is requested to transmit data by an upper layer, and requests the physical layer to provide the LQIV in real-time.

20. The apparatus as claimed in claim 18, wherein the link level determination unit requests the LQIV in an initialization process of a network, temporarily stores the LQIV, and checks the stored LQIV as occasion demands.

21. The apparatus as claimed in claim 12, wherein the characteristics of data include a type of data which indicates event-driven data, on-demand data, or periodic data.

22. An apparatus for transmitting/receiving data, having a physical layer, a Medium Access Control (MAC) Layer, and a network layer in a Wireless Sensor Network (WSN), the apparatus comprising:

a module for transmitting/receiving data in the network layer thereof, the module comprising:

a link level determination unit for predefining a level of a link state, depending on characteristics of data and a Link Quality Indication Value (LQIV) to store a predefined level of the link state, and for determining a level of a link state by applying characteristics of data and an LQIV received from the physical layer to the predefined level of the link state; and a link control unit for controlling the link transfer of the data in consideration of the determined level of the link state by generating a control value corresponding to the determined level of the link state in which the control value includes a value necessary for setting a wait time for reception of a response.

23. The apparatus as claimed in claim 22, wherein the characteristics of data include a type of data which indicates event-driven data, on-demand data, or periodic data.

* * * * *